United States Patent
Tanaka et al.

(10) Patent No.: US 7,558,482 B2
(45) Date of Patent: Jul. 7, 2009

(54) METHOD FOR DYNAMICALLY ESTABLISHING LOGICAL LINK IN PON SYSTEMS AND AN OPTICAL NETWORK UNIT FOR THE METHOD

(75) Inventors: Keiji Tanaka, Saitama (JP); Noboru Edagawa, Saitama (JP)

(73) Assignee: KDDI Corporation, Toyko (JP)

( * ) Notice: Subject to any disclaimer, the term of this patent is extended or adjusted under 35 U.S.C. 154(b) by 580 days.

(21) Appl. No.: 11/251,608

(22) Filed: Oct. 13, 2005

(65) Prior Publication Data

US 2006/0083245 A1    Apr. 20, 2006

(30) Foreign Application Priority Data

Oct. 14, 2004    (JP) .............................. 2004-299598

(51) Int. Cl.
*H04J 14/08*    (2006.01)

(52) U.S. Cl. ....................................................... 398/100

(58) Field of Classification Search ................... 398/43, 398/45, 55, 57, 100; 370/254, 351, 352
See application file for complete search history.

(56) References Cited

U.S. PATENT DOCUMENTS

| 4,780,910 A * | 10/1988 | Huddleston et al. ......... 398/109 |
| 7,289,439 B2 * | 10/2007 | Lee et al. .................... 370/229 |
| 2004/0174867 A1 * | 9/2004 | Nelson et al. ............... 370/352 |

OTHER PUBLICATIONS

IEEE 802.3ah, Draft 3.3, Clause 64, Jul. 2004 (On Order).
IEEE Std 802.3ah, Draft 3.3, Clause 64, Jul. 2004, pp. 421-476.

* cited by examiner

*Primary Examiner*—Leslie Pascal
(74) *Attorney, Agent, or Firm*—Christie, Parker & Hale, LLP

(57) ABSTRACT

The invention is applied to a PON system including an optical line terminal (OLT) at a center station, a plurality of optical network units (ONUs) at subscribers' sites, and an optical transmission line shared by the plurality ONUs to optically connect between the OLT and the plurality of ONUs. Each of the ONUs requests the OLT to assign a logical link according to start-up of an application.

8 Claims, 3 Drawing Sheets

METHOD FOR DYNAMICALLY ESTABLISHING LOGICAL LINK IN PON SYSTEMS AND AN OPTICAL NETWORK UNIT FOR THE METHOD

CROSS REFERENCE TO RELATED APPLICATIONS

This application claims priority to Japanese Patent Application No. 2004-299598, filed on Oct. 14, 2004, the entire contents of which are incorporated herein by reference.

FIELD OF THE INVENTION

This invention relates to a method to dynamically establish logical link in PON (Passive Optical Network) systems and an optical network unit (ONU) apparatus used for the method.

BACKGROUND OF THE INVENTION

A PON system includes a configuration in which an OLT (Optical Line Terminal) and each subscriber's ONU (Optical network Unit) are connected with optical transmission lines made exclusively from passive optical elements. In other words, a 1:n optical splitter is disposed between an optical fiber connected to the OLT and a plurality of optical fibers respectively connected to the ONUs.

In an E-PON (IEEE 802.3ah) system, which has been standardized in July, 2004, a logical link can be established on an optical transmission line using an LLID (Logical Link Identifier) disposed on a preamble part of an MAC frame. Although all users share the same optical transmission line in the E-PON system, communications of each user are logically separated per link and therefore the system is like an aggregate of point-to-point connections. It is possible to establish a plurality of links with a single ONU and in this case, since SLA (Service Level Agreement) can be established per LLID, there is a merit to decide detailed bandwidth settings such as the minimum bandwidth assurance and the maximum allowable bandwidth for each application.

In the E-PON system, a MAC layer is extended to define a layer called multipoint MAC layer and a control protocol, MPCP (Multi-point Control Protocol), is provided to transfer a MAC frame. The basic functions of the MPCP are (1) Gate process to inform transmission timing to an ONU, (2) Discovery process to newly register the ONU under the OLT, (3) Ranging Timing process to measure a distance to the ONU to adjust the timing, and (4) Report process to demand a communication from the ONU to the OLT. The details of the Discovery process are described in IEEE 802.3ah, Draft 3.3, Clause 64.

To detect a newly participating ONU, the OLT regularly launches the Discovery process. In this Discovery process, the OLT first broadcasts upstream-transmission permitting frames called Discovery_Gate to the whole ONUs. A local time T1 of the OLT is recorded in the Discovery_Gate. An ONU that is newly powered on, namely an ONU that is not registered to the OLT, sets its clock according to the local time T1 of the OLT included in the Discovery_Gate, determines a transmission time T2 to the OLT using random numbers, and transmits a Register_Request signal to the OLT to request its register with the OLT at the time T2 together with the information of the time T2. The OLT calculates a distance to the ONU based on the time T1, Time T2, and a time T3 at which the OLT received the Register_Request signal. The OLT transmits to the ONU a registration notification signal, Register, on which an LLID is written. The OLT also determines the transmission time and the period to be taken for the transmission based on the distance to the ONU and informs the information to the ONU by a Gate message. The ONU transmits Register_ACK signal, on which the informed LLID is written, to the OLT at the time indicated on the Gate message. With the above operations, the ONU that was newly powered on is registered with the OLT and establishes a logical link with the OLT.

A plurality of logical links can be established with a single ONU. For instance, in a case that a logical link is to be established per application, when a logical link is established separately with each of three applications, VoIP, VoD (Video on Demand), and the Internet, detailed settings such as the minimum bandwidth assurance and the maximum allowable bandwidth can be made for each application. In this case, however, every ONU has to establish the whole three logical links when it is powered on. Thus, the processes required for establishing logical links also become three times. Therefore, when a number of ONUs are powered on at the same time, it takes a quite long time until the whole ONUs complete the establishment of logical links.

In the E-PON system, upstream signals are access-controlled through dynamic bandwidth allocation. That is, the OLT informs each ONU of a transmittable bandwidth and transmission timing through a Gate message and then each ONU transmits an upstream signal to the OLT using the transmittable timeslot informed by the Gate message. Each ONU further transmits a Report message in the end of the transmittable timeslot to receive a next Gate message. Each ONU informs the OLT of a volume of frames to be transmitted next and requests a bandwidth available through the Report message. The OLT collects the requests for bandwidths from the ONUs, determines bandwidths to be assigned to the ONU according to the DBA algorism, and transmits a Gate message indicating an assigned bandwidth together with a downstream signal to each ONU.

Even if no communications are performed, as far as an ONU is being powered on, the OLT and each ONU exchange DBA control messages of Gate and Report in order to maintain the links. This exchange of the DBA control messages is performed per LLID.

As explained above, in conventional methods, it takes really long time for an ONU to become available because the ONU tries to establish the whole logical links to be used at once when the ONU is powered on.

In addition, when a plurality of LLIDs, e.g. three logical links are assigned to a single ONU, the ONU needs a Discovery process and DBA control processes of Gate/Report for each logical link. In the three logical links, if there is a logical link that is not used, the DBA process performed for the nonuse logical link becomes useless and waste of limited transmission bandwidths. Due to this useless DBA process, a load of the OLT is also increased.

The above problems can be solved by dynamically establishing logical links.

SUMMARY OF THE INVENTION

According to an exemplary embodiment of the invention, in a PON system which includes an OLT, a plurality of ONUs, and an optical transmission line shared by the plurality of ONUs to optically connect the OLT and the plurality of ONUs, method for dynamically establishing logical link is characterized in that each of the ONUs requests the OLT to assign a logical link according to start-up of an application.

An ONU according to an exemplary embodiment of the invention is a unit disposed at each subscriber's site in a PON system and includes first means to request an OLT of the PON system to assign its own logical link in response to a predetermined inquiry message received after the ONU is powered on, a start-up detector to detect start-up of a communication device connected to the ONU, and second means to request the OLT to assign a logical link for the communication device according to the start-up of the communication device. According to the exemplary embodiment, a logical link is established per application as the need arises and thus it prevents the unnecessary use of transmission bandwidths. In addition, the processing capacity of both OLT and ONU is no longer wasted in order to maintain logical links that are not in current use.

BRIEF DESCRIPTION OF THE DRAWINGS

The above and other objects, features and advantages of the present invention will be apparent from the following detailed description of exemplary embodiments of the invention in conjunction with the accompanying drawings, in which.

DETAILED DESCRIPTION

Explanatory embodiments of the invention are explained below in detail with reference to the drawings.

Figure 1:
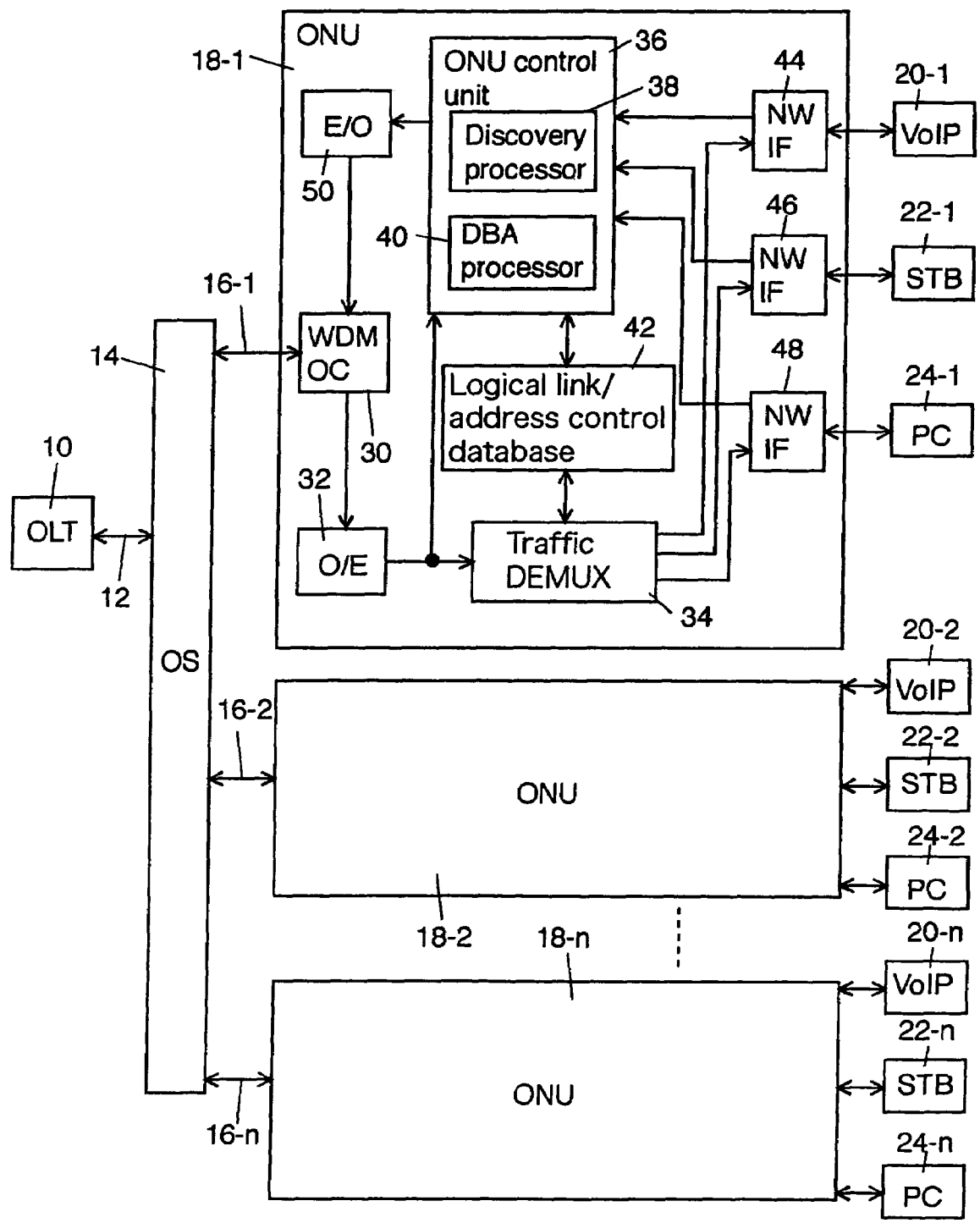
FIG. 1 shows a schematic block diagram of a PON system according to an exemplary embodiment of the invention.

FIG. 1 shows a schematic block diagram according to an exemplary embodiment of the invention. An optical line terminal (OLT) 10, e.g. an optical terminal apparatus disposed at a center station connects to an optical splitter 14 through an optical fiber 12. The optical splitter 14 also connects to optical network units (ONUs) 18-1 to 18-n, e.g. optical terminal apparatuses at subscribers' sites through optical fibers 16-1 to 16-n respectively. The wavelength of a downstream signal light from the OLT 10 to the ONUs 18-1 to 18-n is 1.49 µm while the wavelength of an upstream signal light from the ONUs 18-1 to 18-n to the OLT 10 is 1.31 µm.

The optical splitter 14 is a passive optical element to split a downstream optical signal or a down traffic from the OLT 10 into n portions, outputs the split optical signals to the optical fibers 16-1 to 16-n respectively, and applies upstream optical signals or upstream traffics from the optical fibers 16-1 to 16-n into the optical fiber 12. A plurality of users' units, e.g. VoIP devices 20-1 to 20-n, set-top boxes 22-1 to 22-n to make broadcast service or VoD available, and personal computers 24-1 to 24-n, connect to each of the ONUs 18-1 to 18-n.

The basic operation of the ONUs 18-1 to 18-n is briefly explained below taking the ONU 18-1 as an example. A downstream optical signal output from the OLT 10 enters the ONUs 18-1 to 18-n through the optical fiber 12, the optical splitter 14, and the optical fibers 16-1 to 16-n. A WDM optical coupler 30 in the ONU 18-1 applies the downstream optical signal from the optical fiber 16-1 to an O/E converter 32. The O/E converter 32 converts the input downstream optical signal into an electrical signal and applies the electrical signal to a traffic demultiplexer (DEMUX) 34 and an ONU control unit 36. The ONU control unit 36 includes a Discovery processor 38 and a DBA processor 40. The Discovery processor 38 covers Discovery process. That is, the Discovery processor 38 takes care of establishing logical links between the OLT 10 and the ONU 18-1 by executing predetermined processes with the OLT 10 such as measuring a distance between the OLT 10 and the ONU 18-1 and controlling the timing for transmission of the ONU 18-1. The DBA processor 40 handles transmission of an upstream signal based on a Gate message from the OLT 10 and request of bandwidth to the OLT 10 through a Report message.

A logical link/address control database 42 stores and controls the correspondence between LLIDs assigned for communication uses of the user's units (specifically the VoIP device 20-1, the set-top box 22-1, and the computer 24-1) and addresses (e.g. IP address and/or MAC address etc.) of these devices or network interfaces.

The traffic demultiplexer 34 demultiplexes the signals to-be-provided to the user's units of its group out of downstream signals or downstream traffics from the O/E converter 32 referring to the logical link/address control database 42 and applies the signals to the corresponding network interfaces 44, 46, and 48. Simultaneously, the traffic demultiplexer 34 inquires the logical link/address control database 42 about what LLID is attached to the downstream signal and, when the LLID is assigned one to be addressed to the ONU 18-1 itself, the traffic demultiplexer 34 provides the downstream signal to a corresponding network interface according to the database information while it abandons the downstream signal when the LLID was not assigned one. For example, the traffic demultiplexer 34 provides a data of VoIP to the network interface 44 to which the VoIP device 20-1 is connected, provides a data of broadcast service to the network interface 46 to which the set-top box 22-1 is connected, and provides a data of web browsing and emails via the Internet to the network interface 48 to which the computer 24-1 is connected.

Signals output from the VoIP device 20-1 enter the ONU control unit 36 through the network interface 44, signals output from the set-top box 22-1 enter the ONU control unit 36 through the network interface 46, and signals output from the computer 24-1 enter the ONU control unit 36 through the network interface 48. The ONU control unit 36 assigns a corresponding LLID to the input data signal according to the database information in the logical link/address control database 42 and outputs the signal to an E/O converter 50. The ONU 18-1 also outputs a signal necessary for the control operations with the OLT 10 to the E/O converter 50.

The E/O converter 50 converts the electrical signal from the ONU control unit 36 into an optical signal and applies the optical signal to the WDM optical coupler 30. The WDM optical coupler 30 outputs the optical signal from the E/O converter 50 to the optical fiber 16-1. This optical signal is a so-called upstream optical signal and enters the OLT 10 through the optical fiber 16-1, the optical splitter 14, and the optical fiber 12.

Figure 2:
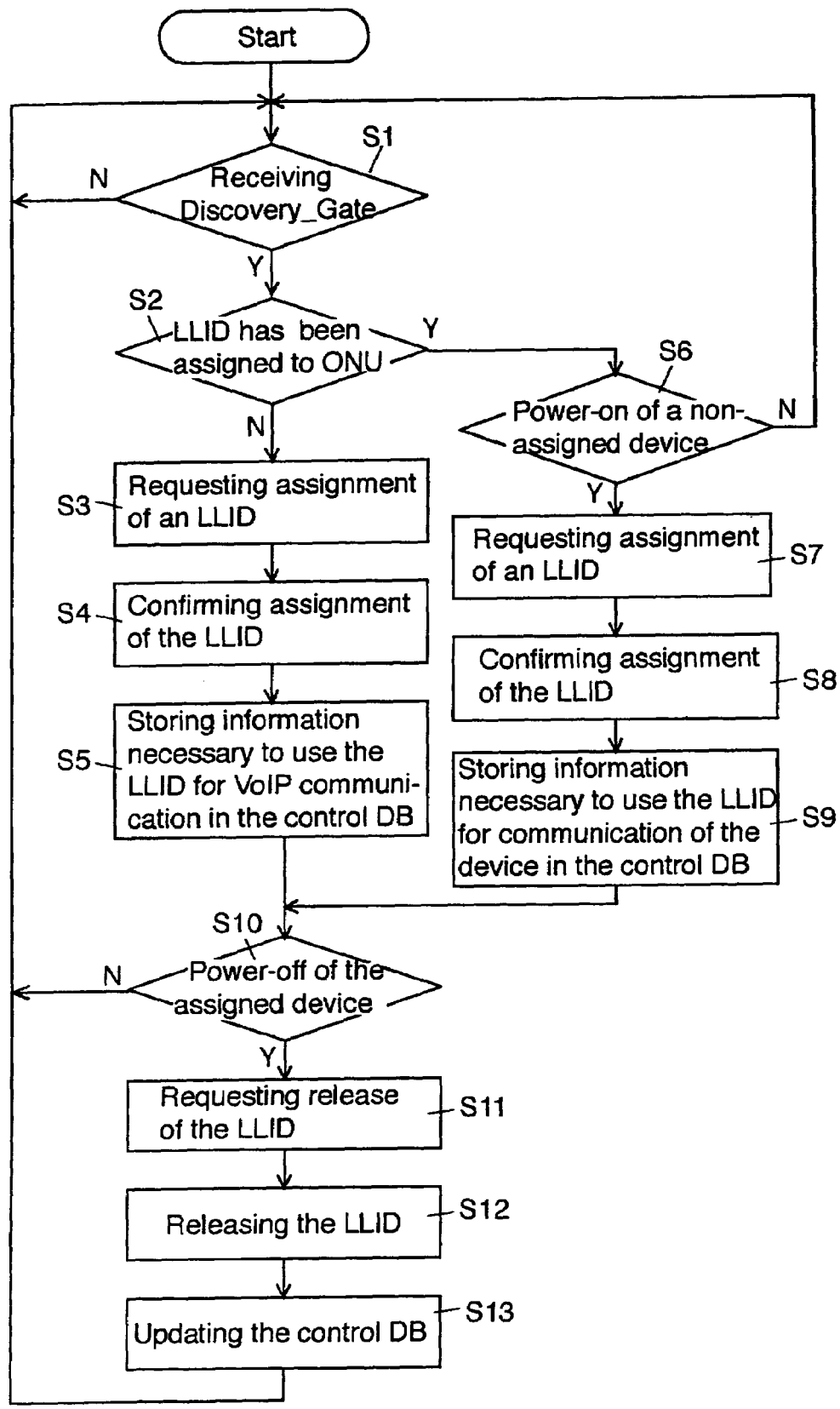
FIG. 2 shows a flow chart of an LLID register/release process according the embodiment.
Figure 3:
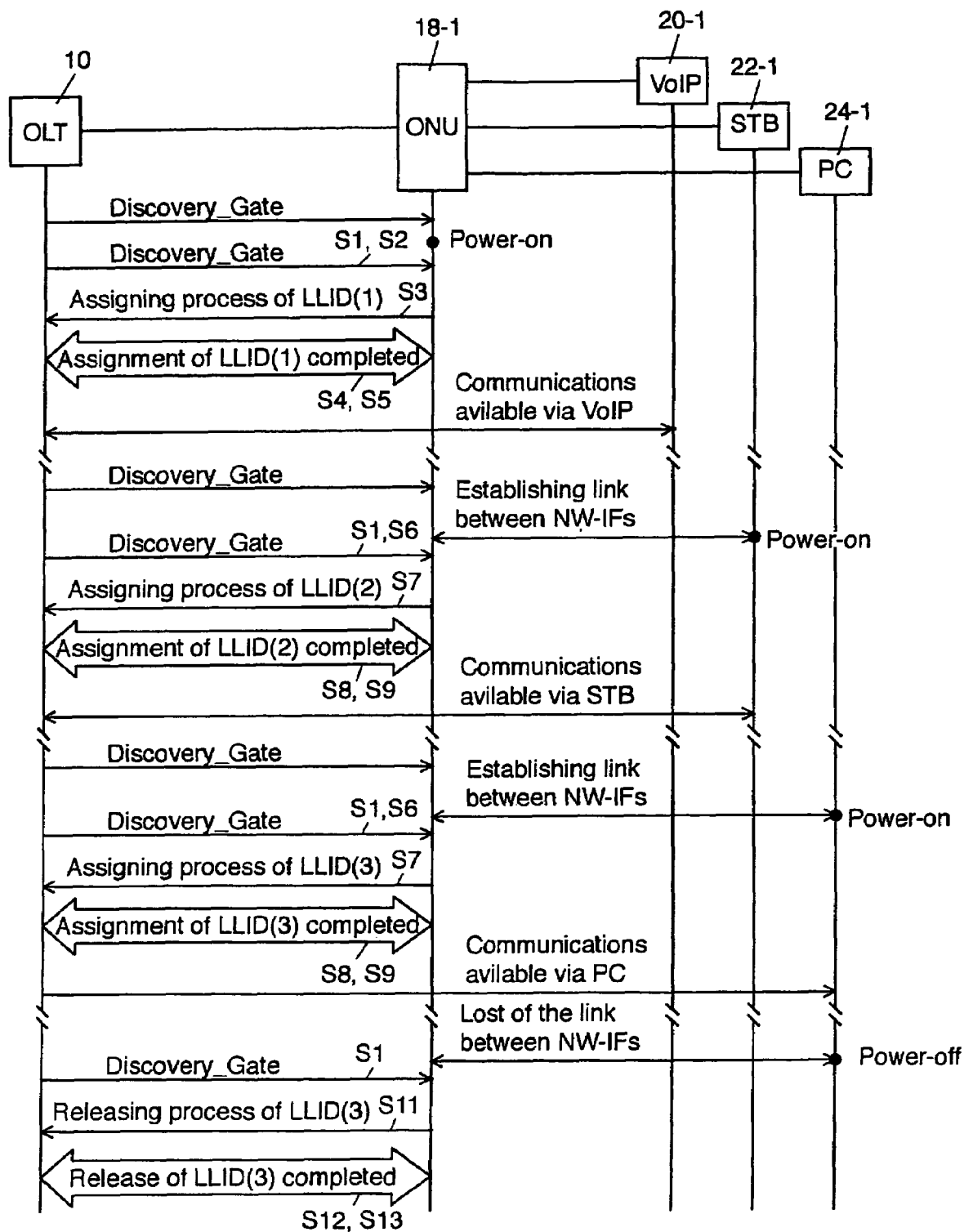
FIG. 3 shows a communication sequence example for LLID register according to the embodiment.

FIG. 2 shows a flow chart of the operations to establish a dynamic logical link according to the embodiment and FIG. 3 shows a communication sequence example to establish a logical link per application. In FIG. 3, the VoIP device 20-1 is set so that it is constantly power-on or it is powered on when the power of the ONU 18-1 is turned on. The set-top box 22-1 and the computer 24-1 are manually or automatically powered on whenever they are to be used. The above steps shown in FIG. 2 are described in FIG. 3 in detail.

Following the power-on, the ONU control unit 36 stands by to receive a Discovery_Gate massage from the OLT 10 (S1).

When the ONU control unit 36 receives the Discovery_Gate massage from the OLT 10(S1), the Discovery processor 38 in the ONU control unit 36 first checks whether an LLID has been assigned to the ONU 18-1 itself (S2).

When no LLID has been assigned to the ONU 18-1 itself (S2), the Discovery processor 38 requests the OLT 10 to assign an LLID to the ONU 18-1 through the above-mentioned method (S3). The OLT 10 assigns a new LLID according to the request and informs the assigned LLID to the ONU 18-1. Having received the LLID informed by the OLT 10, the ONU 18-1 sends an approval signal to the OLT 10 for confirmation (S4). With the above operations, the acquisition procedure of an LLID is completed. The ONU control unit 36 stores the information (specifically, a record or entry indicating the correspondence between the assigned LLID value and the MAC address of the VoIP device 20-1 or the network interface 44 to which the VoIP device 20-1 is connected) necessary to use the obtained LLID for communication use of the VoIP device 20-1 in the logical link/address control database 42 (S5).

Thereafter, the ONU 18-1 transfers downstream signals for VoIP communication to the VoIP device 20-1 through the network interface 44 and transmits a signal from the VoIP device 20-1 to the OLT 10, the signal being contained in a frame having the assigned LLID in the preamble.

The devices to perform communications using an LLID, such as the set-top box 22-1 and the computer 24-1, are checked whether they are powered off. It is possible to confirm by checking if the network connections of the network interfaces 46 and 48 are running. When the ONU 18-1 is powered on, no LLID is assigned at the beginning and thus the operation returns to step S1 to wait for a Discovery_Gate message from the OLT 10 (S1).

When a regular Discovery_Gate message is received from the OLT 10 (S1), the Discovery processor 38 in the ONU control unit 36 checks whether an LLID for VoIP communication use has been assigned to the ONU 18-1 itself (S2). Since an LLID has been already assigned to the ONU 18-1, the Discovery processor 38 then checks the devices connected to the ONU 18-1 whether there is a device that is newly powered on and to which no LLID for communication use is assigned yet (S6). If there is no such device, the operation returns to the step S1 to wait for a Discovery_Gate message from the OLT 10 (S1). In the loop of steps S1, S2, and S6, assuming that the set-top box 22-1, for example, is powered on, the ONU control unit 36 requests the OLT 10 to assign a new LLID through the above-described method in order to get a logical link for the set-top box 22-1 (S7). The OLT 10 assigns a new LLID in response to the request and informs the assigned LLID to the ONU 18-1. Having received the LLID informed by the OLT 10, namely the second LLID, the ONU 18-1 sends an acknowledgement signal to the OLT 10 for confirmation (S8). With the above operations, the acquisition procedure of the second LLID is completed. The ONU control unit 36 then stores the information (specifically, a record or entry indicating the correspondence between the assigned second LLID value and the MAC address of the set-top box 22-1 or the network interface 46 to which the set-top box 22-1 is connected) necessary to use the second LLID for communication use of the set-top box 22-1 in the logical link/address control database 42 (S9).

Hereafter, the ONU 18-1 forwards a downstream signal specified by the second LLID to the set-top box 22-1 through the network interface 46 and transmits a signal from the set-top box 22-1 to the OLT 10, the signal being contained in a frame having the second LLID in the preamble.

The ONU control unit 36 checks the devices that perform communications using the assigned LLID whether there is a device that is powered off (S10). If no device is powered off, the operation returns to step S1.

Assuming that the computer 24-1 is powered on in the loop of the steps S1, S2, and S6, the ONU control unit 36 requests the OLT 10 to assign a third LLID through the above-described method to get a logical link for the communication of the computer 24-1 (S7). The OLT 10 assigns the third LLID in response to the request and informs the assigned LLID to the ONU 18-1. Having received the LLID informed by the OLT 10, the ONU 18-1 transmits an acknowledgement signal to the OLT 10 for confirmation (S8). With the above operations, the acquisition procedure of the third LLID is completed. The ONU control unit 36 stores the information (specifically a record or entry indicating the correspondence between the assigned third LLID value and the MAC address of the computer 24-1 or the network interface 48 to which the computer 24-1 is connected) necessary to use the third LLID for communication use of the computer 24-1 in the logical link/address control database 42 (S9).

Hereafter, the ONU 18-1 forwards a downstream signal specified by the third LLID to the computer 24-1 through the network interface 48 and transmits a signal from the computer 24-1 to the OLT 10, the signal being contained in a frame having the third LLID in the preamble.

As explained above, LLIDs are assigned in sequence for the devices connected to the ONU 18-1 as the need arises and accordingly a logical link is established per application when necessary.

Assuming that the computer 24-1, for example, is turned off, the ONU control unit 36 detects the power-off of the computer 24-1 at the step S10. The ONU control unit 36 then reads out the LLID assigned for the communication use of the computer 24-1 from the logical link/address control database 42 and requests the OLT 10 to release the LLID (S11). To put it concretely, when a Report message corresponding to the LLID is not sent to the OLT 10 from the ONU 18-1 within a given time, the OLT 10 releases the register of the link. Therefore, the operation of not transmitting a Report message corresponding to the LLID is equivalent to the request for the release of the LLID. The OLT 10 releases the LLID according to the request (S12). The record of the released LLID is removed from the logical link/address control database 42 (S13). Hereafter, the operation returns to the step S1 and the ONU control unit 36 waits for a next Discovery_Gate message from the OLT 10.

If the computer 24-1 is powered on again, another LLID for communication use of the computer 24-1 is assigned once more according to the steps S6 to S9.

As described above, in this exemplary embodiment, the establishment of a logical link is limited to the period when an application is actually running. Thus, it is possible to reduce a number of Gate/Report messages that check the maintenance of primarily unnecessary logical links. Since only a necessary and sufficient number of logical links are established in a PON section, transmission bandwidths can be used effectively and the loads of the OLT 10 and the ONUs 18-1 to 18-n to control DBA (Dynamic Band Allocation) and Discovery signals can be reduced. The more the number of the ONU 18-1 to 18-n connected to the single OLT 10 is increased, namely the more the number of necessary logical links is increased, the more this effect stands out.

In the above description, although an LLID is corresponded with a MAC address, it is also applicable to relate an LLID with a TOS (Type of Service) value or a CoS (Class of Service) value of a traffic entered the ONU 18-1, or with a combination of those two values. In this case, the ONU control unit 36 identifies an upstream traffic from the VoIP device 20-1, the set-top box 22-1, or the computer 24-1 according to its TOS or COS value, reads out a corresponding LLID from the logical link/address control database 42, and transmits the upstream traffic to the OLT 10 using the read-out LLID.

It is also applicable that the set-top box 22-1 requests the OLT 10 to assign an LLID when it transmits a signal to the OLT 10 instead of requesting assignment of an LLID as soon as the set-top box 22-1 is powered on. Similar to this, it is applicable that the computer 24-1 requests the OLT 10 to assign an LLID when it accesses a network by the Internet application such as an email or a browser.

In the above-mentioned embodiment, each of the ONUs 18-1 to 18-n includes a home gateway function having the plurality of interfaces 44, 46, and 48. However, even if each of the ONUs 18-1 to 18-n has only one network interface, it is possible to establish a dynamic logical link by using the TOS or CoS value, or a combination of those values as an identifier. That is, it is possible to dynamically establish a logical link by assigning a different TOS value to the VoD and the Internet communications respectively. For instance, assuming that TOS=5 is assigned to a VoIP, TOS=3 is assigned to a VoD of a set-top box, and TOS=0 is assigned to the Internet communications, a logical link start-up procedure for the set-top box or the computer in the PON section is started when a traffic including TOS=1 or 3 enters the ONU.

While the invention has been described with reference to the specific exemplary embodiment, it will be apparent to those skilled in the art that various changes and modifications can be made to the specific embodiment without departing from the spirit and scope of the invention as defined in the claims.

The invention claimed is:

1. In a PON system including an optical line terminal (OLT) at a center station, a plurality of optical network units (ONUs) having at least one network interface for communicating with one or more user units at subscribers' sites, and an optical transmission line shared by the plurality of ONUs to optically connect between the OLT and the plurality of ONUs, a method for dynamically establishing a logical link comprising:

detecting a start-up of an application on a user unit connected via a network interface, by an ONU;

requesting the OLT, by the ONU, to assign a new logical link for the application when the start-up of the application is detected; and assigning the new logical link responsive to the requesting and establishing the new logical link between the OLT and the user unit.

2. The method of claim 1 further comprising detecting an end of the application at the ONU, and breaking the assigned logical link for the application when the end of the application is detected.

3. The method of claim 1 wherein the start-up of the application comprises power-on of the user unit on which the application operates.

4. The method of claim 2 wherein the end of the application comprises power-off of the user unit on which the application operates.

5. An optical network unit (ONU) disposed at each subscriber's site in a PON system comprising:

at least one network interface for one or more communication devices;

first means to request an OLT in the PON system to assign a logical link in response to a predetermined inquiry message received after the ONU is powered on;

a start-up detector to detect a start-up of a communication device connected to the ONU via a network interface; and second means to request the OLT to assign a new logical link for the communication device when the start-up of the communication device is detected.

6. The ONU of claim 5 further comprising third means to break the assigned new logical link according to an end of the communication device detected by the start-up detector.

7. The ONU of claim 5 wherein the start-up of the communication device comprises a power-on of the communication device.

8. The ONU of claim 6 wherein the end of the communication device comprises a power-off of the communication device.

\* \* \* \* \*